United States Patent
Liou et al.

(10) Patent No.: US 9,063,227 B2
(45) Date of Patent: Jun. 23, 2015

(54) POSITIONING APPARATUS AND SIGNAL PROCESSING METHOD THEREOF

(75) Inventors: Hsiao-Lieh Liou, Taipei (TW); Shiou-Gwo Lin, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 470 days.

(21) Appl. No.: 13/352,294

(22) Filed: Jan. 17, 2012

(65) Prior Publication Data

US 2013/0057429 A1   Mar. 7, 2013

(30) Foreign Application Priority Data

Sep. 1, 2011   (CN) .......................... 2011 1 0257591

(51) Int. Cl.
*G01S 19/40*   (2010.01)
*G01S 19/22*   (2010.01)

(52) U.S. Cl.
CPC . *G01S 19/40* (2013.01); *G01S 19/22* (2013.01)

(58) Field of Classification Search
CPC ................................ G01S 19/40; G01S 19/41
USPC ....................................... 342/357.23, 357.24
See application file for complete search history.

(56) References Cited

U.S. PATENT DOCUMENTS

| | | | |
|---|---|---|---|
| 6,862,558 B2 | 3/2005 | Huang | |
| 2002/0050944 A1* | 5/2002 | Sheynblat et al. | 342/357.06 |

FOREIGN PATENT DOCUMENTS

| | | |
|---|---|---|
| CN | 1307684 A | 8/2001 |
| TW | 201012439 | 4/2010 |

OTHER PUBLICATIONS

Agrafioti, 2011, IEEE, 06004922, p. 1.*
Huang, 2008, IEEE, 04960873, pp. 1-4.*
Jian Wang et al., "GPS Baseline Solution Based on Empirical Mode Decomposition," Feb. 2008, 10 pages, vol. 37, No. 1, Acta Geodaetica et Cartographica Sinica, China.

* cited by examiner

*Primary Examiner* — Harry Liu

(57) ABSTRACT

A signal processing method of a positioning apparatus includes receiving a wireless satellite signal to generate distance information; generating a distance correction quantity according to the distance information and reference coordinate information; processing the distance correction quantity through iteration by using an Empirical Mode Decomposition (EMD) method, to generate multiple mode functions; and analyzing the mode functions, so as to select a part of the mode functions as a modified distance correction quantity to be output.

12 Claims, 4 Drawing Sheets

POSITIONING APPARATUS AND SIGNAL PROCESSING METHOD THEREOF

BACKGROUND

1. Technical Field

The present disclosure relates to a signal processing method, and more particularly to a positioning apparatus and a signal processing method thereof.

2. Related Art

Global Navigation Satellite Systems (GNSS) can provide precise localization in most areas on the surface of the earth. As the GNSS can guide a user to travel along a correct route, the burden of the user for watching a map or noticing road marks at any time is alleviated. However, errors from a satellite, atmosphere influence, multipath effect, and receiver noise error (including thermal noise and signal interference) may result in a poor localization effect from locating signals of the GNSS. In addition, a range of error of a general GNSS localization accuracy is about 10 to 25 meters.

In order to improve the localization accuracy of the GNSS, the localization error may be modified with the principle of Differential GNSS (DGNSS), so the localization accuracy may greatly be improved to a range of error to 1 to 5 meters. However, when the DGNSS obtains a modified signal, the multipath effect and the receiver noise error in a received distance signal still can cause a less precise localization correction quantity generated by the DGNSS, so the localization accuracy still may be improvable.

SUMMARY

The disclosure discloses a signal processing method of a positioning apparatus, which includes receiving a satellite signal, to generate distance information; generating a distance correction quantity according to the distance information and reference coordinate information; processing the distance correction quantity through iteration by using an Empirical Mode Decomposition (EMD) method, to generate multiple mode functions; and analyzing the mode functions to select a part of the mode functions as a modified distance correction quantity to be output.

The disclosure further discloses a positioning apparatus, which includes a receiving unit, a calculation unit, and a processing unit. The receiving unit is used for receiving a satellite signal. The calculation unit is coupled to the receiving unit, generates distance information according to the satellite signal, and calculates a distance correction quantity according to the distance information and reference coordinate information. The processing unit is coupled to the receiving unit, and is used for processing the distance correction quantity through iteration by using a empirical mode decomposition method to generate multiple mode functions, and analyze the mode functions, so as to select a part of the mode functions as a modified distance correction quantity to be output.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
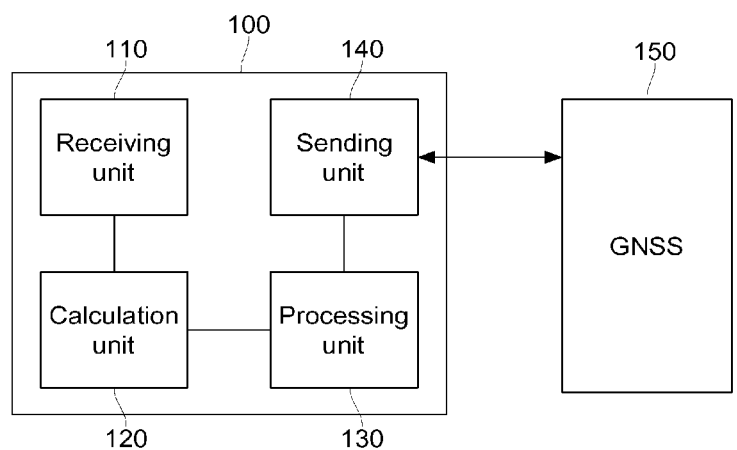
FIG. 1 is a block diagram of a positioning apparatus according to a first embodiment.

FIG. 1 is a block diagram of a positioning apparatus according to a first embodiment. In this embodiment, a positioning apparatus 100 may be DGNSS, which is suitable for providing a precise distance correction quantity to GNSS 150 for use, so that locating information of the GNSS is much more precise. The positioning apparatus 100 includes a receiving unit 110, a calculation unit 120, a processing unit 130, and a sending unit 140.

The receiving unit 110 is used for receiving a satellite signal. That is, the positioning apparatus 100 is connected to a satellite through the signal receiving unit 110, so the positioning apparatus 100 receives the satellite signal sent by the satellite. The calculation unit 120 is coupled to the receiving unit 110, and used for generating distance information according to the satellite signal, and calculates a distance correction quantity according to the distance information and reference coordinate information.

The processing unit 130 is coupled to the calculation unit 120, and used for processing the distance correction quantity through iteration by using an EMD method, to generate multiple mode functions. Then, the mode functions are analyzed to select a part of the mode functions as a modified distance correction quantity to be output. In this way, multipath noise and receiver noise in the original distance correction quantity can be effectively filtered off, so as to output a more precise modified distance correction quantity.

The sending unit 140 is coupled to the processing unit 130, and used to send the modified distance correction quantity generated by the processing unit 130 to the GNSS 150, so that the GNSS 150 can generate more precise locating information with, for example, a locating error range of about 1 meter.

In this embodiment, the processing unit 130 may be a microprocessor, a multi-core microprocessor or array, a signal processor, or a Field Programmable Gate Array (FPGA).

Hereinbefore, the operation of the processing unit 130 is approximately described, and details of an operation process of the processing unit 130 are further described below. First, the processing unit 130 reads a distance correction quantity $x(t)$ generated by the calculation unit 120, and performs an extremum seeking processing on the distance correction quantity $x(t)$, to obtain a maximum group and a minimum group in the distance correction quantity $x(t)$.

When the maximum group and the minimum group are sought out, the processing unit 130 processes the maximum group and the minimum group by using a cubic spline, to generate an upper envelope EMAX and a lower envelope EMIN. Specifically, the processing unit 130 connects all maximums in the maximum group into the upper envelope by using the cubic spline, and connects all minimums in the minimum group into the lower envelope by using the cubic spline.

Subsequently, the processing unit 130 calculates the upper envelope EMAX and the lower envelope EMIN to generate an average envelope m(t). In this embodiment, the average envelope m(t) is an average value of the upper envelope EMAX and the lower envelope EMIN, that is, m(t)=(EMAX+EMIN)/2. After the average envelope m(t) is obtained, the processing unit 130 subtracts the average envelope m(t) from the distance correction quantity x(t) to generate a component signal d(t), that is, d(t)=x(t)−m(t). Afterwards, the processing unit 130 determines whether the calculated component signal d(t) meets a mode function condition.

If the component signal does not meet the mode function condition, the processing unit 130 substitutes the component signal d(t) for the current distance correction, and repeats the above-mentioned processing performed on the distance correction quantity x(t), until a component signal meeting the mode function condition is obtained. Then, the obtained component signal is regarded as a mode function for subsequent processing.

Otherwise, if the component signal d(t) meets the mode function condition is determined, the processing unit 130 regards the component signal d(t) as a mode function component, e.g., an Intrinsic Mode Function (IMF), in which i is set to 0 initially. Then, the processing unit 130 subtracts the obtained mode function $IMF_i(t)$ from the distance correction quantity x(t) to obtain a residual signal $R_i(t)$, and determines whether the obtained residual signal $R_i(t)$ meets a termination condition.

If it is determined that the residual signal $R_i(t)$ does not meet the termination condition, the processing unit 130 substitutes the residual signal $R_i(t)$ for the distance correction quantity x(t), and repeats the above-mentioned processing performed on the distance correction quantity x(t), until a component signal meeting the mode function condition is obtained. The obtained component signal is regarded as a mode function component, e.g., $IMF_{i+1}(t)$. Subsequently, the processing unit 130 obtains a residual signal $R_{i+1}(t)$ according to the distance correction quantity x(t) and the mode function $IMF_{i+1}(t)$, until at least one subsequent residual signal meets the termination condition. Otherwise, if it is determined that the residual signal $R_i(t)$ meets the termination condition, multiple satisfactory mode functions are output.

In this embodiment, the variation cycle of a multipath error is about several minutes, and the thermal noise error of a receiver is white noise which changes more quickly, so the processing unit 130 takes the physical properties of the multipath and the receiver noise error as determination criteria. That is to say, the processing unit 130 compares the variation cycle of the mode function with a preset time, which is, e.g., 10 minutes. Then, if it is determined that the variation cycle of the mode function is less than the preset time, the processing unit 130 regards the mode function as a noise. If it is determined that the variation cycle of the mode function is greater than the preset time, the processing unit 130 regards the mode function as a meaningful signal. As such, the multipath noise and the receiver noise error carried in the distance correction quantity can be filtered off through the variation cycle of the mode function obtained through analysis, so that the modified distance correction quantity is more precise, and thus the locating signal generated by the positioning apparatus is more precise.

In addition, the mode function is generated by continuous iteration to seek a component meeting the mode function condition, and for the purpose of not destroying the physical meanings of the instantaneous frequency and the instantaneous amplitude of the signal, the processing unit 130 sets the above-mentioned termination condition to avoid destroying the physical meanings of the signal due to excessive selecting times.

In this embodiment, the processing unit 130 subtracts the lower envelope EMIN from the upper envelope EMAX, and then divides the difference by 2, to generate a mode amplitude a(t), that is, a(t)=(EMAX−EMIN)/2. Subsequently, the processing unit 130 divides the average envelope m(t) by the mode amplitude a(t) and then takes an absolute value of the quotient, to generate an estimated function a(t), that is, σ(t)=|m(t)/a(t)|.

After the mode amplitude a(t) and the estimated function σ(t) are obtained, the processing unit 130 takes a length of the distance correction quantity as 1, and uses that a length portion (1−α) reaches $\sigma(t)<\theta_1$ and a length portion α reaches $\sigma(t)<\theta_2$ as a termination condition. That is to say, when the processing unit 130 determines that the length portion (1−α) of the distance correction quantity reaches $\sigma(t)<\theta_1$ and the length portion α of the distance correction quantity reaches $\sigma(t)<\theta_2$, it is indicated that the residual function $R_i(t)$ meets the termination condition, and the signal decomposition process is terminated, to generate a satisfactory mode function. In some embodiments, typical settings are α≈0.05, θ≈0.05 and $\theta_2 \approx 10\theta_1$.

Figure 2:
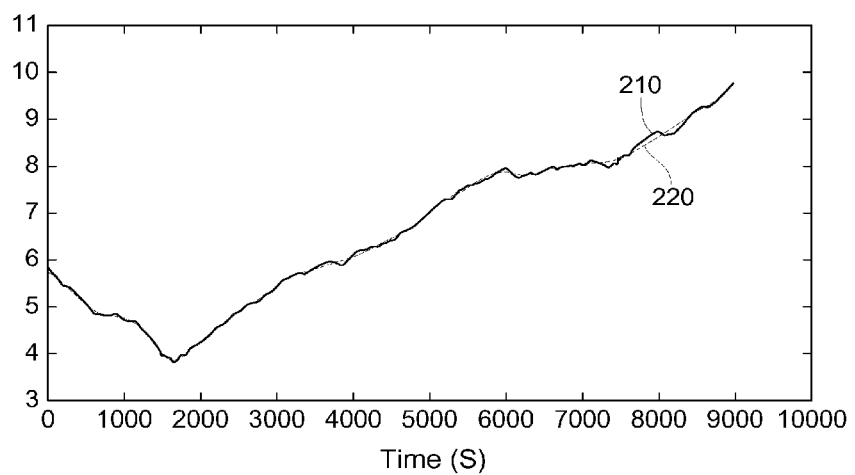
FIG. 2 is an oscillogram of a distance correction quantity and a modified distance correction quantity according to the first embodiment.
Figure 3:
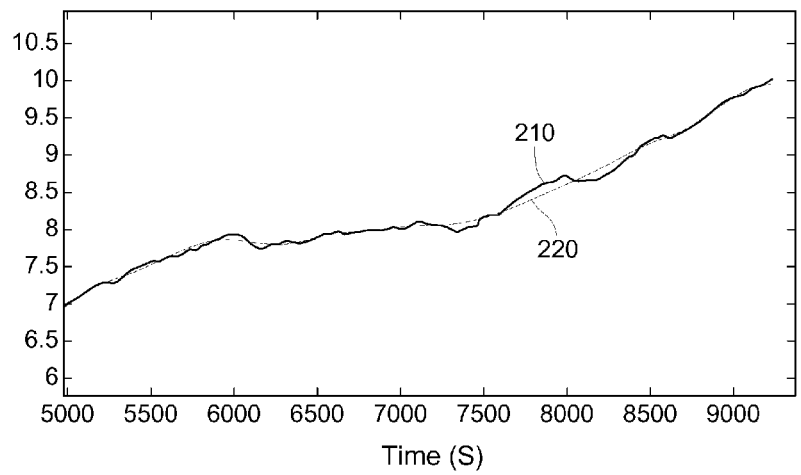
FIG. 3 is a partially enlarged oscillogram of the distance correction quantity and the modified distance correction quantity according to the first embodiment.

FIGS. 2 and 3 are an oscillogram and a partially enlarged oscillogram of the distance correction quantity and the modified distance correction quantity according to the first embodiment. As shown in FIGS. 2 and 3, the distance correction 210 indicates an original correlation calculated by the positioning apparatus 100; the modified distance correction quantity 220 indicates a correlation generated by the EMD method. In FIG. 3, the distance correction quantity 210 still has the multipath noise and the receiver noise error; however, the modified distance correction quantity 220 obtained through the EMD method in this embodiment is smoother, that the multi-path noise and the receiver noise error are efficiently removed. As a result, the modified distance correction quantity provided by the positioning apparatus 100 is more precise, and thus the locating information generated by the GNSS 150 as shown in FIG. 1 is also more precise, e.g., the range of error of locating is about 1 meter.

Figure 4:
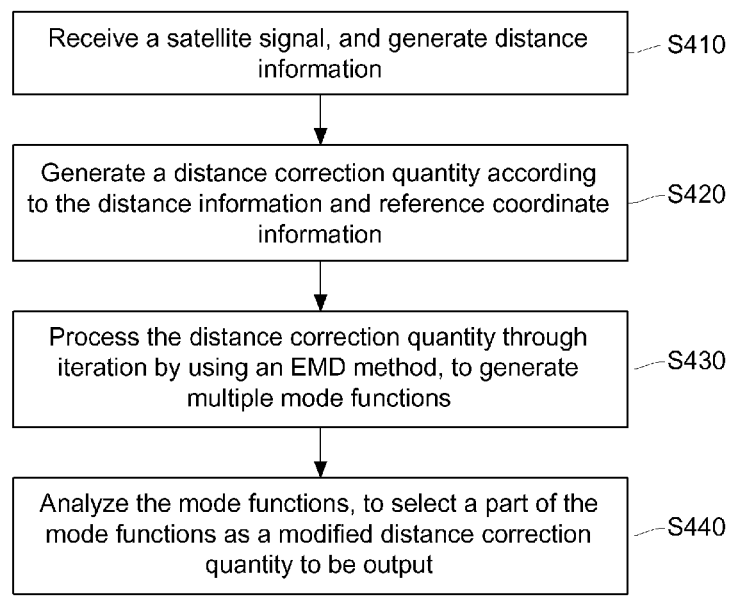
FIG. 4 is a flow chart of a signal processing method of a positioning apparatus according to a second embodiment.

A signal processing method of a positioning apparatus can be induced from the description in the first embodiment. FIG. 4 is a flow chart of a signal processing method of a positioning apparatus according to a second embodiment.

As shown in FIG. 4, in Step S410, a satellite signal is received, and distance information is generated. A positioning apparatus may receive the satellite signal generated by a satellite through a signal receiving module. In Step S420, a distance correction quantity is generated according to the distance information and reference coordinate information. In Step S430, the distance correction quantity is processed through iteration by using an EMD method, to generate multiple mode functions. In Step S440, the mode functions are analyzed, to select a part of the mode functions as a modified correction quantity to be output.

Figure 5:
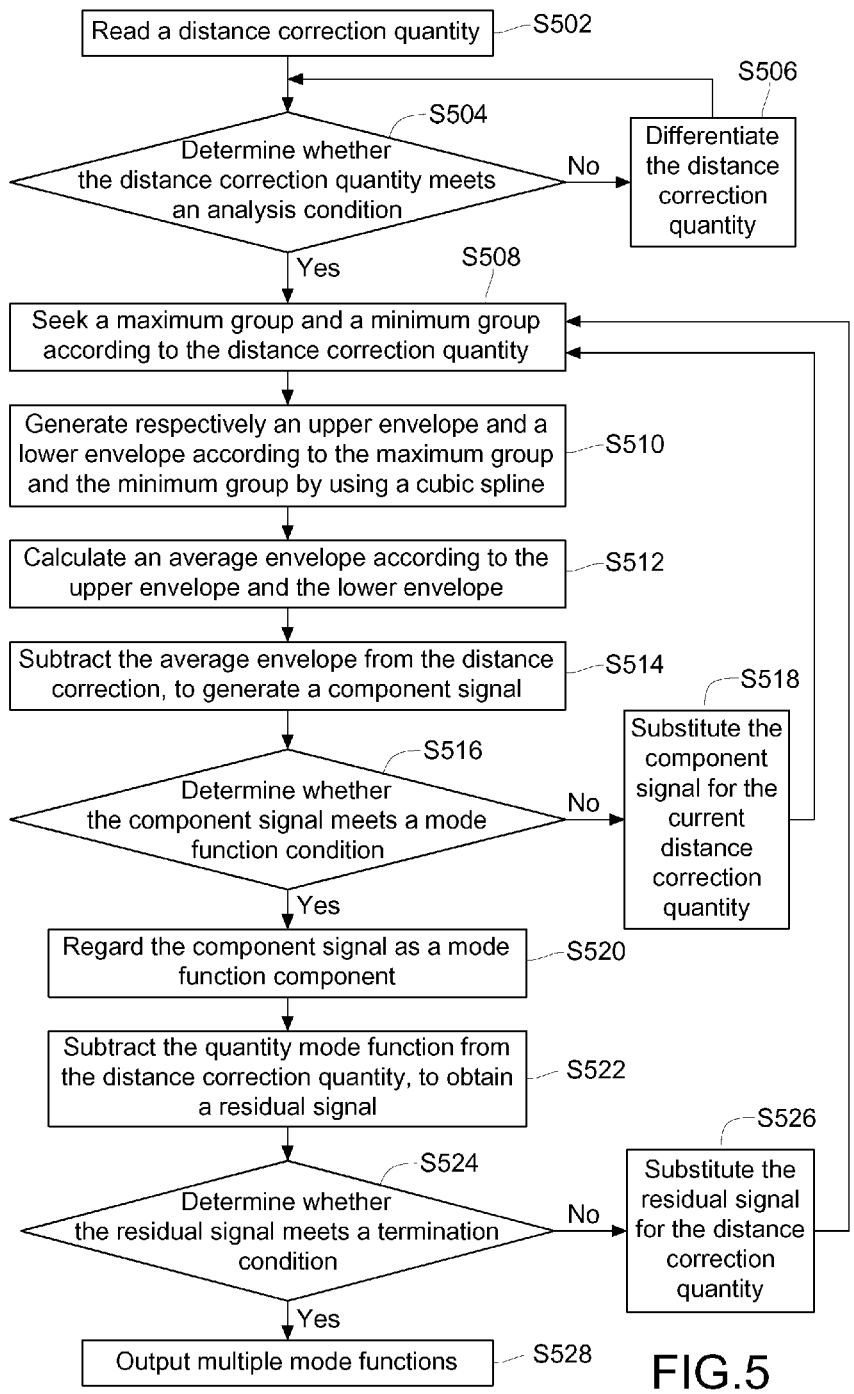
FIG. 5 shows an implementation example of Step S430 in FIG. 4.

FIG. 5 is an implementation example of Step S430 in FIG. 4. In Step S502, a distance correction quantity x(t) is read. In Step S504, whether the distance correction quantity meets an analysis condition is determined, in which the analysis condition is whether the distance correction quantity has at least one maximum and at least one minimum.

If the distance correction quantity does not meet the analysis condition, Step S506 is performed, in which the distance correction quantity is differentiated, and then the process returns to Step S504, and another above-mentioned determination is performed, until the distance correction quantity meets the analysis condition.

Otherwise, if the distance correction quantity meets the analysis condition, Step S508 is performed, in which the maximum group and the minimum group are sought out according to the distance correction quantity x(t). Then, in Step S510, an upper envelope EMAX and a lower envelope EMIN are respectively established according to the maximum group and the minimum group by using a cubic spline. That is to say, all maximums in the maximum group are connected into an upper envelope by using the cubic spline, and all minimums in the minimum group are connected into a lower envelope by using the cubic spline.

In Step S512, an average envelope m(t) is generated according to the upper envelope EMAX and the lower envelope EMIN, that is, m(t)=(EMAX+EMIN)/2. In Step S514, the average envelope m(t) is subtracted from the distance correction quantity x(t) to generate a component signal d(t), that is, d(t)=x(t)−m(t). In Step S516, whether the component signal d(t) meets a mode function condition is determined.

If the component signal dose not meet the mode function condition, Step S518 is performed, in which the component signal d(t) is substituted for the current distance correction quantity x(t), and the process returns to Step S508, and Steps S508 to S516 are repeated, until a component signal meeting the mode function condition in Step S516 is obtained. Then Step S520 is performed. Otherwise, if the component signal d(t) meets the mode function condition, Step S520 is performed, in which the component signal d(t) is regarded as a mode function component $IMF_i(t)$, e.g., an IMF, in which i is set to 0 initially.

In Step S522, the above-mentioned obtained mode function $IMF_i(t)$ is subtracted from the distance correction quantity x(t) to obtain a residual signal $R_i(t)$, in which i is set to 0 initially. In Step S524, whether the residual signal $R_i(t)$ meets a termination condition is determined.

If the residual signal $R_i(t)$ does not meet the termination condition, Step S524 is performed, in which the residual signal Ri is substituted for the distance correction quantity x(t), the process returns to the Step S508, and Steps S508 to S514 are repeated to obtain another component signal, which is regarded as the mode function component $IMF_{i+1}(t)$. After another mode function component $IMF_{i+1}(t)$ is obtained, Steps S520 to S522 are performed to obtain another residual signal $R_{i+1}(t)$, and then in Step S524, whether the residual signal $R_{i+1}(t)$ meets the termination condition is determined, until at least one of subsequent residual signals meets the termination condition. Otherwise, if the residual signal $R_i(t)$ meets the termination condition, Step S528 is performed to output multiple mode functions.

Figure 6:
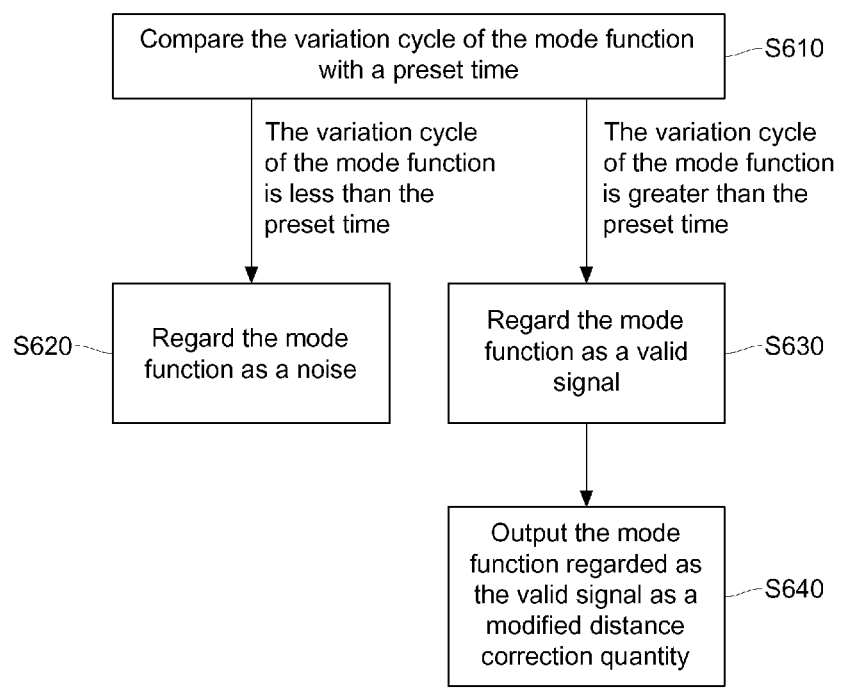
FIG. 6 shows an implementation example of Step S440 in FIG. 4.

FIG. 6 is an implementation example of Step S440 in FIG. 4. In Step S610, a variation cycle of the mode function is compared with a preset time. If the variation cycle of the mode function is less than the preset time, Step S620 is performed, in which the mode function is regarded as a noise. If the variation cycle of the mode function is greater than the preset time, Step S630 is performed, in which the mode function is regarded as a valid signal. Subsequently, in Step 640, the mode function regarded as the valid signal is outputted as a modified distance correction quantity. In this way, noises in the original distance correction quantity are effectively filtered off, so that the locating information of the positioning apparatus is more precise.

In summary, in the positioning apparatus and the signal processing method thereof according to the disclosure, the distance correction quantity is decomposed into multiple mode functions through the EMD method, and the mode functions are analyzed to combine mode functions classified as valid signals into a modified distance correction. In this way, the multi-path noise and the receiver noise error carried in the original distance correction quantity can be effectively filtered off, so as to provide a precise distance correction quantity to the GNSS, and thus the locating information of the GNSS is more precise.

What is claimed is:

1. A signal processing method of a positioning apparatus, comprising:
   receiving a GNSS satellite signal from a satellite and generating distance information indicating a distance between the positioning apparatus and the satellite;
   generating a distance correction quantity according to the distance information and reference coordinate information of a reference location, wherein the distance correction quantity indicates a difference between the distance information and an actual distance between the positioning apparatus and the satellite;
   processing the distance correction quantity through iteration by using an Empirical Mode Decomposition (EMD) method, to generate multiple mode functions; and
   analyzing the mode functions, to select a part of the mode functions as a modified distance correction quantity to be output.

2. The signal processing method of a positioning apparatus according to claim 1, wherein the step of processing the distance correction quantity through iteration to generate multiple mode functions comprises:
   seeking a maximum group and a minimum group according to the distance correction quantity;
   generating respectively an upper envelope and a lower envelope according to the maximum group and the minimum group by using a cubic spline;
   calculating an average envelope according to the upper envelope and the lower envelope;
   subtracting the average envelope from the distance correction quantity, to generate a component signal; and
   determining whether the component signal meets a mode condition,
   wherein if the component signal meets the mode condition, the component signal is regarded as a mode function component; and
   if the component signal does not meet the mode condition, the component signal is substituted for the distance correction quantity to perform another iteration, until a component signal corresponding to at least one of subsequent iterations meets the mode condition, and the component signal corresponding to the subsequent iteration is regarded as a mode function component.

3. The signal processing method of a positioning apparatus according to claim 2, wherein before the step of seeking the maximum group and the minimum group according to the distance correction, the method further comprises:
   reading a distance correction quantity;
   determining whether the distance correction quantity meets an analysis condition, wherein the analysis condition is that the distance correction quantity has at least one maximum and at least one minimum;
   performing a step of seeking the maximum group and the minimum group according to the distance correction quantity if the distance correction quantity meets the analysis condition; and
   differentiating the distance correction quantity if the distance correction quantity does not meet the analysis condition, and returning to the step of determining whether the distance correction quantity meets the analysis condition to perform another determination, until the distance correction quantity meets the analysis condition.

4. The signal processing method of a positioning apparatus according to claim 2, further comprising:
   subtracting the mode function component from the original distance correction quantity, to obtain a residual signal;
   determining whether the residual signal meets a termination condition;
   regarding the residual signal as a distance correction quantity if the residual signal does not meet the termination condition, and returning to the step of seeking the maximum group and the minimum group according to the distance correction quantity to perform another iteration, until a mode function corresponding to at least one of subsequent iterations meets the termination condition; and
   outputting multiple mode functions if the residual signal meets the termination condition.

5. The signal processing method of a positioning apparatus according to claim 1, wherein the step of analyzing the mode functions, to select a part of the mode functions as the modified distance correction quantity to be output comprises:
   comparing the variation cycles of the mode functions and a preset time;
   regarding a mode function as a noise if the variation cycle of the mode function is less than the preset time;
   regarding a mode function as a valid signal if the variation cycle of the mode function is greater than the preset time; and
   outputting the mode function regarded as the valid signal as the modified distance correction quantity to be output.

6. A positioning apparatus, comprises:
   a receiving unit configured to receive a GNSS satellite signal from a satellite;
   a calculation unit, coupled to the receiving unit, and configured to generate distance information according to the satellite signal indicating a distance between the positioning apparatus and the satellite, and calculate a distance correction quantity according to the distance information and reference coordinate information of a reference location, wherein the distance correction quantity indicates a difference between the distance information and an actual distance between the positioning apparatus and the satellite;
   a processing unit, coupled to the calculation unit, and configured to process the distance correction quantity through iteration by using a configuration mode decomposition method to generate multiple mode functions, and analyze the mode functions, so as to select a part of the mode functions as a modified distance correction quantity to be output.

7. The positioning apparatus according to claim 6, wherein the processing unit further seeks a maximum group and a minimum group according to the distance correction, generates respectively an upper envelope and a lower envelope according to the maximum group and the minimum group by using a cubic spline, calculates an average envelope according to the upper envelope and the lower envelope, subtracts the average envelope from the distance correction quantity to generate a component signal, and determines whether the component signal meets a mode condition, wherein if the component signal meets the mode condition, the component signal is regarded as a mode function component; and if the component signal does not meet the mode condition, the component signal is regarded as a distance correction quantity for another iteration, until a component signal corresponding to at least one of subsequent iterations meets the mode condition, and the component signal corresponding to the subsequent iteration is the mode function component.

8. The positioning apparatus according to claim 7, wherein the processing unit determines whether the distance correction quantity meets an analysis condition, wherein if the distance correction quantity meets the analysis condition, multiple maximums and multiple minimums are taken to generate the maximum group and the minimum group, and if the distance correction quantity does not meet the analysis condition, the distance correction quantity is differentiated to perform another determination, until the distance correction quantity meets the analysis condition, in which the analysis condition is that the distance correction quantity has at least one maximum and at least one minimum.

9. The positioning apparatus according to claim 7, wherein the processing unit subtracts the mode function component from the original distance correction quantity to obtain a residual signal, and determines whether the residual signal meets a termination condition, wherein if the residual signal does not meet the termination condition, the residual signal is regarded as a distance correction quantity and the process returns to perform another iteration accordingly, until a mode function according to the at least one subsequent iterations meets the termination condition.

10. The positioning apparatus according to claim 7, wherein the processing unit compares the variation cycles of the mode functions with a preset time, wherein if the variation cycle of the mode function is less than the preset time, the processing unit regards the mode function as a noise, and if the variation cycle of the mode function is greater than the preset time, the processing unit regards the mode function as a valid signal; and the processing unit uses the mode function regarded as the valid signal as the modified distance correction quantity to be output.

11. The signal processing method of a positioning apparatus according to claim 1, wherein the processing unit comprises a microprocessor.

12. The positioning apparatus according to claim 6, wherein the processing unit comprises a microprocessor.

* * * * *